United States Patent [19]

Thomson

[11] 3,955,189

[45] May 4, 1976

[54] DATA DISPLAY TERMINAL HAVING DATA STORAGE AND TRANSFER APPARATUS EMPLOYING MATRIX NOTATION ADDRESSING

[75] Inventor: Douglas H. Thomson, Orange, Calif.

[73] Assignee: Lear Siegler, Santa Monica, Calif.

[22] Filed: July 24, 1974

[21] Appl. No.: 491,279

[52] U.S. Cl. .......................... 340/324 AD; 178/15

[51] Int. Cl.[2] .......................... G06F 3/14

[58] Field of Search .............. 340/324 AD; 346/108, 346/110; 178/15

[56] References Cited

UNITED STATES PATENTS

| | | | |
|---|---|---|---|
| 3,426,344 | 2/1969 | Clark | 340/324 AD |
| 3,701,988 | 10/1972 | Allaart | 340/324 AD |

*Primary Examiner*—Marshall M. Curtis
*Attorney, Agent, or Firm*—Christie, Parker & Hale

[57] ABSTRACT

Disclosed is data storage and transfer apparatus forming a sub-system of a data display terminal of the type in which a page of characters arranged in rows and columns are displayed on a television monitor by means of converting a plurality of character-representing data words into a pattern of pulses that control the intensity of the television beam during the course of its raster scan. An advantageous composition of text on the display screen is obtained in that the number of characters per row is not arbitrarily limited to being a power of two. There is provided a multi-location random access memory (RAM) having sufficient storage capacity to store all the data words for a full page. Circuitry is provided for addressing the RAM by address pointers that are represented in matrix notation. The circuitry includes address converter circuitry for converting the address pointers to absolute addresses for selecting locations of the RAM in connection with the transfer of data words into and out of the RAM.

3 Claims, 7 Drawing Figures

DATA DISPLAY TERMINAL HAVING DATA STORAGE AND TRANSFER APPARATUS EMPLOYING MATRIX NOTATION ADDRESSING

BACKGROUND

This invention relates to data display terminals.

A data display terminal is a device used to encode, display, and send data to a remote data processing system, and to receive and display data from the data processing system. Such display terminals have many applications. For example, the display terminal can be located in a stock broker's office and can provide for the display of stock market data supplied over teletype lines from a remote computer on inquiry from the display terminal.

The television monitor has for a variety of reasons become the preferred device for displaying the data. In operation, the monitor displays a page of characters arranged in rows and columns with each character being made up of selected bright dots within a dot matrix. Conventionally, the dot matrix is 7 × 5 (i.e., 7 raster lines by 5 dot positions). Control of the video is achieved by converting in a predetermined sequence a plurality of character-representing data words into a pattern of pulses that control the intensity of the television beam during the course of its raster scan. Thus, the video control signal must be an appropriately synchronized serial-by-bit format.

Whereas only one bit of information at a time is provided to the monitor, the display terminal must provide storage for many thousands of other bits of information making up the data words for the full page. Moreover, the page storage means must be accessible not only for reading in connection with video control but also for writing and reading in connection with entry and removal of data.

The page storage means has data entered into and removed from it so that it maintains an up-to-date record of data received from the remote computer and from a keyboard included in the data display terminal. Various arrangements for the page storage means have been proposed, and various approaches have been directed to the control task of addressing and timing accesses to it so that data can be properly located in it and accessed on a non-interfering basis.

In one conventional arrangement, the page storage means is constructed as a group of recirculating shift registers, each such shift register providing storage of data words corresponding to a row of characters. Although this arrangement to some extent facilitates the task of providing a serial-by-bit video signal format, the digital circuitry necessary to implement the addressing function is quite complex. This is particularly so with respect to editing. For example, in the operation of a data display terminal, it is sometimes necessary to rearrange the display of characters by moving some characters from one row to another. This of course means that corresponding data words in some part of one shift register must be transferred to some part of another shift register. The timing and control circuitry required to achieve this is generally quite complicated and accordingly increases the overall cost of the data display terminal.

The page storage means has also been constructed in the form of a random access, location addressable memory. According to this approach, each character-representing data word is stored in a different addressable location of the random access memory. Several problems have arisen in connection with this type of memory. First of all, the problem of conflicting demands for access to the memory is significant. That is, at a time when the random access memory is tied up in connection with a read access for purposes of forming the video control signal it is not available for access in connection with entry of new data words. One approach to this problem is to disable the read accesses related to the video control signal whenever new data words are to be entered. However, when this is done, the display screen will go blank for an interval of time and this can be disturbing to the operator.

A separate problem involved with the use of such random access memories relates to the addressing system for them. Inasmuch as the page of characters is arranged as a row/column matrix, it is preferable that the random access memory storing the data words for the characters to be addressable in terms of a row/-column address. So long as the number of characters per row is a power of two (e.g., 16, 32, 64, etc.) this poses no problem. Accordingly, the known data display terminals that have employed a random access page memory (rather than the shift-memory-type page memory) are organized so that the number of characters per row is such a power of two. In many cases, however, so as to present a better composition of text on the display screen, it is preferable to have a different number of characters per row.

SUMMARY

According to a key distinguishing feature, this invention provides an arrangement with which there is achieved in combination the two above-described desirable objectives of advantageous composition of text and matrix notation addressing. Preferably, this arrangement also facilitates the non-interfering accessing of a random access memory used as a page storage means in a data display terminal.

A data display terminal embodying this invention includes a television monitor in which a beam is deflected in position to sweep in a pattern of raster lines. The beam is intensity modulated so that a first plurality of raster lines display a page of characters arranged in rows and columns with each displayed character being made up of selected bright dots within a dot matrix. A second plurality of the raster lines provide blank spaces between the rows. In the preferred embodiment of the display terminal, timing signals are generated by means including cyclical counting means. A plurality of different counting states are defined by the cyclical counting means. A first timing indication is provided that indicates when the beam is sweeping through any one of the blank-space raster lines between rows, and a second timing indication is provided that indicates when the beam has traversed a column. The page storage means for the data display terminal is a random access memory having a plurality of addressable locations. The locations respectively store multi-bit data words encoded to represent the characters of the page. A second memory means is provided that has storage capacity sufficient to store each of the data words for a full row. In the preferred embodiment, first data transfer means are operated in response to the first timing indication to effect a transfer of data words from the first to the second memory means so that, upon completion of the sweep of a blank-space raster line immediately preceding any particular row, the second memory means stores each of the data words for that particular row. Converter circuit means are coupled to receive data words one-by-one from the second memory means and, in response, generate a signal for controlling the intensity of the beam. Second data transfer means are operated in response to the second timing indication to effect a data word at a time transfer to the converter circuit means.

Inasmuch as the accesses to the random access memory for purposes of display read-out are timed to occur during the blank space lines, at all other times accesses for other purposes such as editing and the like can be made without interference.

Advantageously, there are provided a plurality of consecutive blank-space raster lines between rows. During each of a plurality of such raster lines separate groups of the data words for a full row are transferred to the second memory means. Owing to this feature, the maximum rate at which data words are read from the random access memory is substantially lowered.

Significantly, first address register means for the random access memory provide storage of address pointers that are represented in matrix notation. That is, as to each character in the page there is a matrix address comprising a row address and a column address. So as to provide a conveniently usable format the number of columns is not arbitrarily selected to be a power of two. Instead, a conveniently usable number such as 80 characters per row are used. Whereas the matrix addressing is convenient for use by the operator, the random access memory itself is addressable in terms of a conventional binary address. Accordingly, there is provided address converter means preferably including a table look-up memory storing base addresses used in a base-relative addressing arrangement.

DRAWINGS

FIG. 2 shows the preferred arrangement of the countdown circuitry 45 of FIG. 1;

FIG. 3 shows the preferred arrangement of the circuitry used for providing absolute addresses to the RAM10 of FIG. 1;

FIG. 4 shows the preferred arrangement of circuitry used in the system of FIG. 1 for controlling data word transfers from the RAM10 of the buffer 51;

FIG. 5 shows the preferred arrangement of circuitry used in the system of FIG. 1 for converting data words into serial-by-bit format so as to provide a video control signal;

FIG. 6 shows the preferred arrangement of circuitry used in the timing and control means 5 of FIG. 1; and FIG. 7 shows the preferred arrangement of registers used in the system of FIG. 1 for storing matrixnotation address pointers, and of circuitry for transferring such address pointers.

DESCRIPTION

General Description

Figure 1:
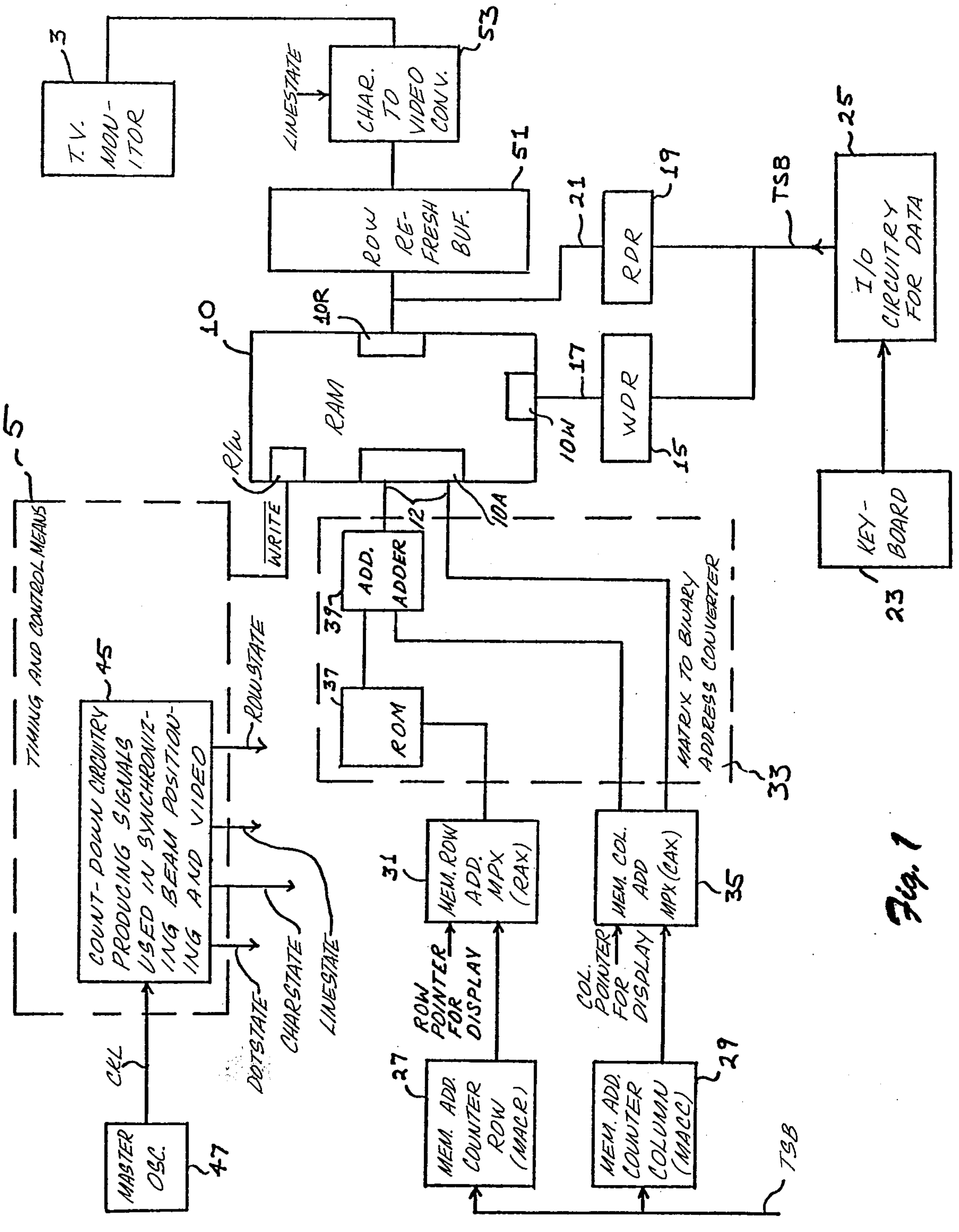
FIG. 1 is an overall block diagram of a preferred embodiment of this invention.

With reference to FIG. 1, there will be given in this section an overall, general description. More detailed descriptions as to the construction and operation of specific blocks shown in FIG. 1 are given in separate sections below.

A data display terminal including this invention has a conventional television monitor 3 in which a beam is deflected in position to sweep in a pattern of raster lines. Timing and control means 5 includes circuitry for providing synchronization signals to control the sweep and frame rate of these raster lines.

As well be described in more detail below, the raster pattern defined in the specifically described embodiment comprises 216 raster lines which are consecutively generated and then followed by a period of time equivalent to 45 raster lines during which vertical retrace takes place. The 216 raster lines form first and second sets. The first set is used to display a page of characters arranged in rows and columns, with each character being made up of selected bright dots in a dot matrix. The first set consists of 24 subsets of 7 consecutive raster lines each; that is, a total of 168 raster lines. The other set, comprising 48 lines, provides blank spaces of two lines each between the rows.

In the data display terminal, the characters are represented by encoded data words. A random access memory (RAM10) is provided which has storage capacity sufficient to store a full page of characters. Preferably, as described in more detail below, the RAM10 is constructed of integrated circuit memory chips that are arranged to define a plurality of addressable locations. Each addressable location provides for the storage of a respective one of the data words. The RAM10 has an address input, 10A, a data word input 10W and a separate data word output 10R and a control input R/W for receiving a read/write control signal ($\overline{\text{WRITE}}$).

Although it is only necessary to provide 6 data bits per data word for proper encoding of the conventional character set of 64 characters, there are advantageously provided 8 storage cells per location in the RAM10. The two extra storage cells provide for storing control bits that can be used in various ways not pertinent to an understanding of this invention.

Binary coded address signals are supplied to the RAM10 on a bus 12 comprising 11 signal leads. In FIG. 1, the individual signal leads of the bus 12 and other buses to be described are not individually shown.

A write data register (WDR15) for storing data words to be written into the RAM10 is coupled thereto by a bus 17. A separate read data register (RDR19) is coupled to the RAM10 by a bus 21. The RDR19 stores data words read from the RAM10 in connection with its updating such as when editing operations occur.

New data words are inserted into the RAM10 as a result of the actuation of keys on a keyboard 23. Conventional input/output circuitry 25 under keyboard control applies data words to a tri-state bus (TSB). The term "tri-state" is used because in the specific embodiment the logic circuits connected to it are of the type manufactured and sold by National Semi-Conductor Corp. under the trademark "Tri-state logic." The new data words carried by the tri-state bus are loaded into the RDR19 and thereafter are written into the RAM10.

So as to keep track of where such new data words are to be stored there are provided a pair of counting registers that store address pointers represented in matrix notation. That is, one of the counting registers (MACR 27) stores a row address, and the other (MACC 29) stores a column address. The matrix notation is convenient, particularly from the human engineering point of view. That is, the operator who has the monitor before him, readily perceives where a particular character will be displayed when he thinks in terms of what row and what column of the page intersect at the particular display area.

Whereas the matrix addressing is convenient for the operator, the RAM10 itself is addressable in terms of a conventional binary address. Of course, if the number of characters per row is arbitrarily fixed so as to be a power of two, then the row and column addresses can be simply concatenated to form a single binary address. However, arbitrarily fixing the format in this way often does not make effective use of the display area on the monitor. Instead, it is preferable to provide a different number of characters per row. In the specifically described embodiment, there are provided 80 characters per row.

With the specific embodiment providing 24 rows and 80 characters per row, there are a total of 1920 characters per page. A feature of the addressing system to be described below resides in the ease with which an optional 12-row page can be provided. For such a 12-row page, the RAM10 includes a single 1024-location integrated circuit memory. For a full 24-row page, two such 1024-location integrated circuit memories are provided.

The matrix address pointers defined by MACR 27 and MACC 29 are used primarily in connection with reading and writing operations incident to updating the RAM10. Separately, similar address pointers are provided in connection with reading operations incident to the display function. To this end, the timing and control means 5 provides such address pointers, these being identified in FIG. 1 as ROWSTATE and CHARSTATE.

Multiplexing circuitry is provided for selecting which of the two sources of address pointers are to be used in addressing the memory. A memory row address multiplexer circuit (RAX31) selects the row component for coupling to a matrix to binary address converter (MBAC33). A memory column address multiplexer (CAX35) selects the column component for coupling to the MBAC33.

Within the MBAC33 there is advantageously provided a read-only memory (ROM37) that stores a table of base addresses. The row component of an address pointer is used for addressing the ROM37 so as to read out a selected one of the table of base addresses. An address adder 39 combines each selected base address with a portion of the column component to form a partial sum address. This partial sum address is concatenated with the remaining portion of the column component to form the absolute address used to access the RAM10.

As a general introduction to the operation of the addressing system, consider an example in which row decimal number 2, column decimal number 70 is being designated. In this case MACR27, will have stored in it as the row component the binary number 00010, and MACC29 will have stored in it as the column component the binary number 1000110. The row component is used in addressing the ROM 37 which has stored in this addressed location the binary number 0000101. (A full listing of the table of base addresses stored in ROM 37 is given hereinafter.)

The address adder 39 combines the three most significant bits of the column component with the selected base address to form a partial sum. In this case, the partial sum is binary 100 plus binary 0000101 or equivalently, 0001001. This partial sum is concatenated with the four least significant bits of the column component to form the absolute address. In this example, the absolute address is binary 00010010110 or, equivalently, decimal 150.

In more general terms, the address converter 35 operates to provide a one-to-one mapping between address pointers in matrix format to absolute addresses in binary format. The preferred mapping is such that, as to each evenly numbered row, sequentially numbered columns map into sequentially numbered binary addresses of one of the 1024-location memories. For brevity of description here, a matrix pointer will be designated in the form (R,C) where R is the row component and C is the column component. Thus, expressed in decimal terms, the pointers (0,0) through (0,79) map into absolute addresses 0 through 79; the pointers (2,0) through (2,79) map into absolute addresses 80 through 159; and so forth. As to the odd numbered rows, these being used only when 24 rows are provided, sequentially numbered columns map into sequentially numbered binary addresses of the other of the 1024-location memories. Again expressing this in decimal terms, the pointers (1,0) through (1,79) map into absolute addresses 1024 through 1103; the pointers (3,0) through (3,79) map into 1104 through 1183, and so forth.

As was mentioned above, among the signals provided by the timing and control means 5 are CHARSTATE and ROWSTATE. These are produced by counter stages within a chain of cyclical counting means 45.

The counter stages, not individually shown in FIG. 1, define various sub-cycles of the overall cycle of the cyclical counting means 45. In response to a CKL signal provided by a master oscillator circuit 47, the cyclical counting means 45 defines in each overall cycle a sequence of different counting states. Preferably, each overall cycle of the cyclical counting means 45 corresponds in duration to the frame period of the television monitor raster scan. In the following description, the term "active line" is used to refer to the particular raster line that the electron beam at a given point is sweeping through. The term "active row" is used to refer to the particular row of characters associated with the active line. In accordance with the conventional practice directed to avoiding the flicker sensation, there are advantageously 60 frames per second. Accordingly, there is provided a binary coded ROWSTATE signal that defines a cycle 60 times every second. The ROWSTATE signal during each of its cycles proceeds in a first sequence identifying one-by-one the currently active row and then a second sequence corresponding in duration to the vertical retrace time.

Separately, there is provided a binary coded LINESTATE signal that, among other things, provides an indication of whether the currently active line is one of a first plurality used in displaying characters or is one of a second plurality used in providing blank-space lines between rows.

Also, there is provided a binary coded DOTSTATE signal defining a sub-cycle that corresponds in duration to the time allotted within an individual raster line to displaying a single one of the columns of the page of characters. Thus, the DOTSPACE signal provides an indication related to the traversal of a column by the sweeping electron beam of the television monitor.

An important feature of the arrangement of FIG. 1 is that the accesses to the RAMIO for purposes of display read out are timed to occur during the blank-space lines. Thus, at all other times, accesses to RAMIO for purposes of editing and the like can be made without interference or queuing.

In reading out the data words for purposes of display, the data words for a full row are transferred serial-by-word, parallel-by-bit to memory means comprising a row refresh buffer 51. In a particularly advantageous feature, there are provided a plurality of blank-space raster lines between rows. During each of a plurality of such raster lines, separate groups of the data words for a full row are so transferred. For example, immediately upon completion of the last raster line used in the display of characters in row decimal number 0, there follows two consecutive blank-space lines. In the specifically described embodiment, there are transferred one-by-one the data words for column decimal numbers 0–39 during the first such raster line and, thereafter, the data words for column decimal numbers 40–79 during the second such raster line. Thus, upon completion of the blank-space raster line immediately preceding the first raster line used in the display of the characters in row decimal number 1, there is stored in the row buffer 51 each of the 80 data words for the new row.

After being transferred to the row buffer 51, the data words are transferred in turn one-by-one to a converter 53 that effects a conversion of each data word to a serial-by-bit signal used in the control of the intensity of the electron beam of the monitor 3.

COUNT-DOWN CIRCUITRY

Figure 2:
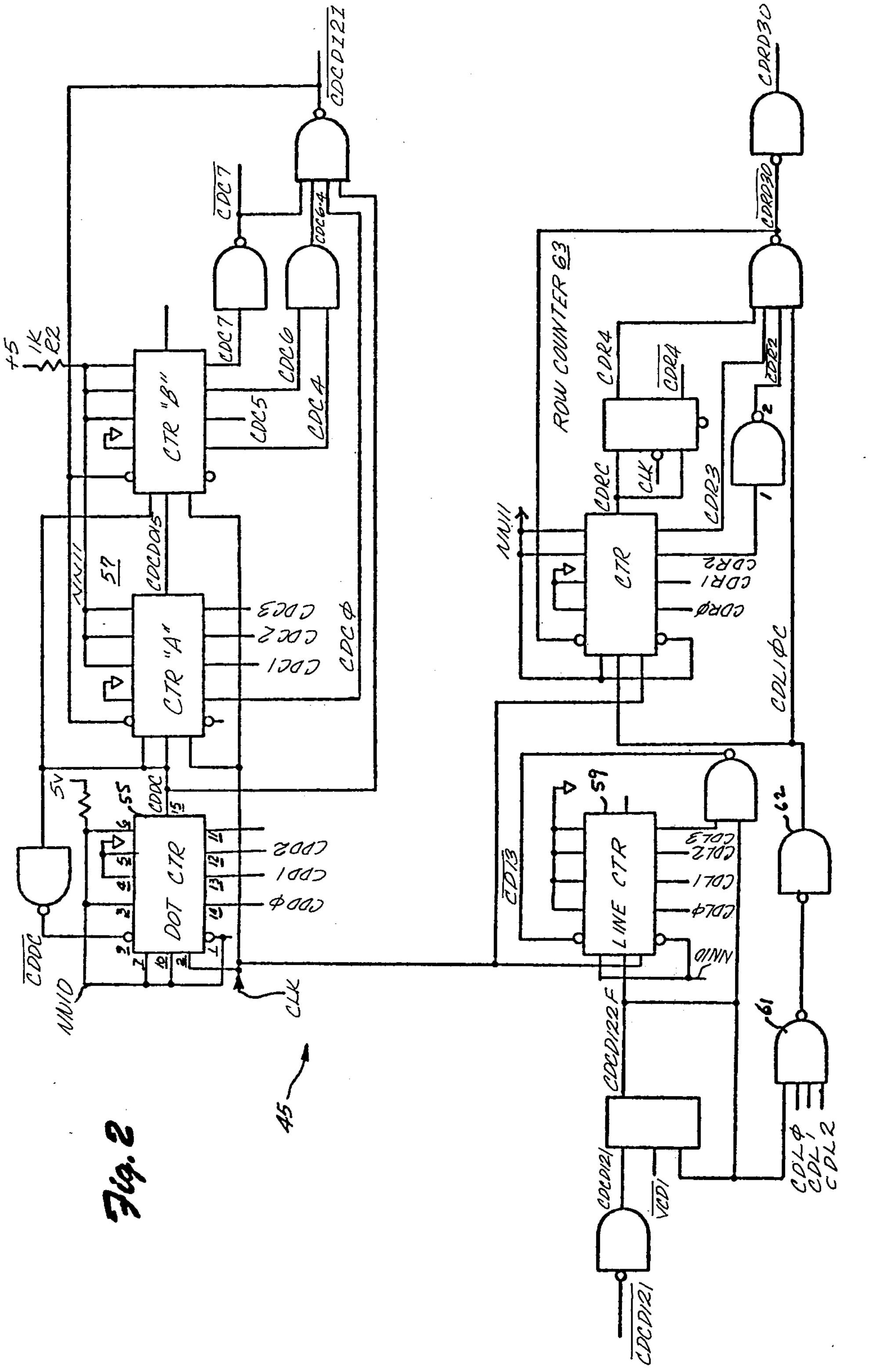
FIGS. 2–7 are block diagrams showing in more detail the preferred construction of various portions of the embodiment of FIG. 1 wherein, in particular.

In FIG. 2 there is shown in more detail the arrangement of the count-down circuitry 45 within the timing and control means 5.

The CLK signal (received from the master oscillator 47 shown in FIG. 1) is a pulse train having a pulse repetition rate of 10.962 MHZ in the specific embodiment.

A dot counter 55 is clocked by the CLK signal. The dot counter 55 (and the other counters to be described in connection with FIG. 2) is preferably of the integrated-circuit type sold under the designation SN54161 by various semiconductor manufacturers. By industry standards, various pin or terminal numbers are assigned to the various inputs and outputs of such integrated circuits. These standard pin numbers are shown adjacent to the block in the drawing and are underlined so as to distinguish these numbers from the reference numerals used in connection with this description. To simplify the drawings, like logic circuits are drawn alike and these pin numbers are shown next to the first described of the like circuits.

The dot counter 55 is connected in a conventional arrangement so that it operates as a divide-by-7 counter. Three of the output signals of the dot counter 55, identified as CDD0, CDD1, an CDD2, define the DOTSTATE signal discussed above. These three output signals in combination define a cyclical sequence of binary coded numbers that proceed from decimal 1 to decimal 7 and then recycle to decimal 1. Another output signal of the dot counter 55, identified as CDDC, is at the logical 1 level during state 7 (i.e., CDD0, CDD1, and CDD2 each equal 1), and is 0 otherwise.

The CDDC signal serves as a count-up enable control signal for a column counter 57. The column counter is connected in a conventional arrangement so that it operates as a divide-by-100 counter. The column counter includes in tandem connection a counter A and a counter B each preferably of the SN54161 type. It also includes a decoding network comprising two NAND gates and an AND gate that cooperate to form a signal identified as $\overline{\text{CDCD121}}$. This signal is 0 when the column counter defines the octal number 121 (i.e., decimal 81).

The output signals of the column counter, identified as CDC0 through CDC7, define the CHARSTATE signal discussed above. These eight output signals in combination define a cyclical sequence of binary coded numbers that proceed incrementally from decimal 0 to decimal 81 (a sub-total of 82 counting states) then jump to decimal 238, again proceed incrementally to decimal 255 (a sub-total of 18 counting states which are related to the horizontal retrace time), and then recycle to decimal 0.

The $\overline{\text{CDCD121}}$ signal is used in connection with enabling the counting up of a line counter 59. The line counter is connected in a conventional arrangement so that it operates as a divide-by-9 counter. The output signals of the line counter, identified as CDL0 through CDL3, define the LINESTATE signal discussed above. These four output signals in combination define a cyclical sequence of binary coded numbers that proceed incrementally from decimal 0 to decimal 8 and then recycle to decimal 0.

A gating arrangement comprising tandem NAND gates 61 and 62 decodes the state of the line counter 59 and forms a CDL10C signal. This signal is used as a count-up enable signal for a row counter 63.

The row counter 63 is connected in a conventional arrangement so that it operates as a divide-by-29 counter. The row counter 63 includes in tandem connection a counter preferably of the SN5416 type and a flip-flop circuit. It also includes a decoding network comprising two NAND gates that cooperate to form a signal identified as $\overline{\text{CDRD30}}$. This signal is 0 when the row counter defines the octal number 30 (i.e., decimal 24).

The outputs of the row counter, identified as CDRO through CDR4, define the ROWSTATE signal discussed above. These five output signals in combination define a cyclical sequence of binary coded numbers that proceed incrementally from decimal 0 to decimal 24 (a sub-total of 25 counting states), then jump to decimal 28, and again proceed incrementally to decimal 31 (a sub-total of 5 counting states which are related to the vertical retrace time), and then recycle to decimal 0.

Among other things, the count-down circuitry provides for the synchronization of the raster scan of the monitor 3, with the $\overline{\text{CDCD121}}$ and the $\overline{\text{CDRD30}}$ signals being used in conventional manner to control respectively the horizontal and vertical drive of the sweep. Owing to this synchornization, the counting states of the count-down circuitry indicate in digital fashion the particular position of the sweeping beam. Thus, the ROWSTATE signal indicates whether vertical retrace is taking place or, if not, which of the 24 rows is currently active. The LINESTATE signal indicates whether a blank-space line is active or, if not, which of the 7 lines is active within the active row. The CHARSTATE signal indicates whether horizontal retrace is taking place or, if not, which of the 80 columns is active as to the active row. Finally, the DOTSTATE signal gives the most detailed information as to the beam position.

RANDOM ACCESS MEMORY ADDRESSING SYSTEM

Figure 3:
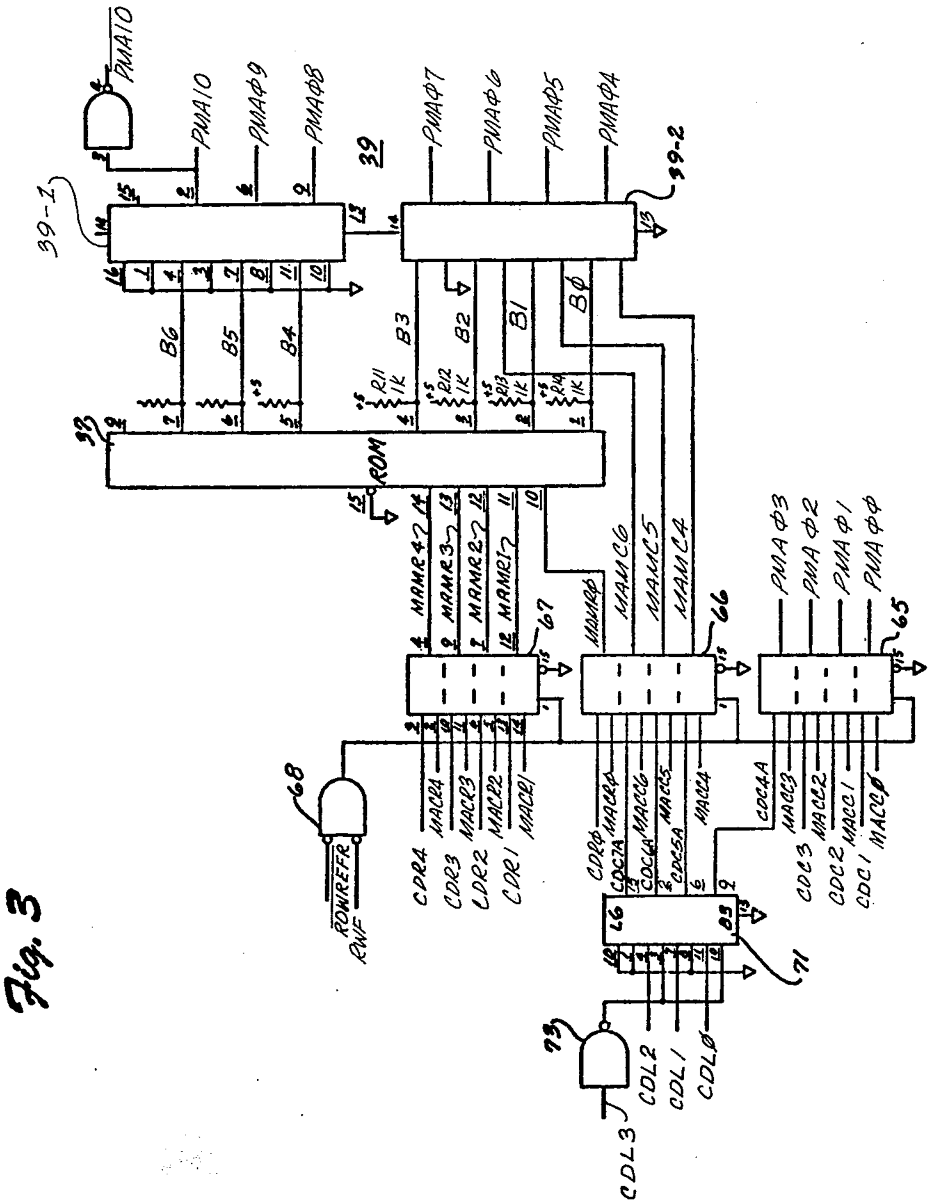

In FIG. 3, the absolute addressing signals used in addressing the RAM10 (FIG. 1) are identified as PMA00 through PMA10. The address pointers, which as discussed above are converted into absolute addresses, are supplied either by the countdown circuitry (FIG. 2) or by the counters MACR27 and MACC29 (FIG. 1).

To effect the multiplexing of these pointers, there are in the specifically described embodiment three integrated circuit chips 65, 66, and 67, each being of the type sold under the designation SN54157. In combination, these chips perform the function ascribed to RAX31 and CAX35 (FIG. 1). A NOR gate 68, having its output connected to pin 1 of each of the chips 65–67, controls which of the two sources of pointers will be used.

The input signals applied to the NOR gate 68 are identified as ROWREFR and RWF. The source of these signals will be described in a separate section below, and for present purposes it needs only to be mentioned here first that the ROWREFR signal is 0 during the time transfers are being effected between RAM10 and the buffer 51 (FIG. 1). (This it will be recalled occurs during the blank-space raster lines between rows.) Second, the RWF signal is 0 whenever no access to the RAM10 is taking place in connection with its updating. In effect then, the output signal of the NOR gate 68 is a 1 only when an access to the RAM10 is to be made in connection with the display read out.

The output signals of the chip 65 are the PMA00 through PMA03 signals which are the four least significant bits of the absolute address. When the output signal of the NOR gate 68 is 0, these four bits are copies of the four least significant bits provided by the MACC29; that is MACC0 through MACC3.

There are four output signals of the chip 66, three of which are identified as MAMC4, MAMC5, and MAMC6, these being used together as a relative address. The fourth output signal is identified as MAMR0, this being used as the least significant bit of an address for the ROM37.

The four most significant bits of the address for the ROM37 are identified as MAMR1 through MAMR4, these being provided at the output of the chip 67.

The ROM37 provides an output comprising 7 parallel signals B0-B6 that together form a partial base address.

The ROM37 is preferably an integrated circuit programmable read only memory of the type sold by Signetics Corporation under the designation 8223. Various semiconductor manufacturers sell these devices to meet specified characteristics as to the data to be stored in the locations of the memory. Table I below lists such specifications for the device used here.

TABLE I

| WORD | MAM R4 | R3 | R2 | R1 | R0 | B6 | B5 | B4 | B3 | B2 | B1 | B0 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 1 | 1 | 0 | 0 | 0 | 0 | 0 | 0 |
| 2 | 0 | 0 | 0 | 1 | 0 | 0 | 0 | 0 | 0 | 1 | 0 | 1 |
| 3 | 0 | 0 | 0 | 1 | 1 | 1 | 0 | 0 | 0 | 1 | 0 | 1 |
| 4 | 0 | 0 | 1 | 0 | 0 | 0 | 0 | 0 | 1 | 0 | 1 | 0 |
| 5 | 0 | 0 | 1 | 0 | 1 | 1 | 0 | 0 | 1 | 0 | 1 | 0 |
| 6 | 0 | 0 | 1 | 1 | 0 | 0 | 0 | 0 | 1 | 1 | 1 | 1 |
| 7 | 0 | 0 | 1 | 1 | 1 | 1 | 0 | 0 | 1 | 1 | 1 | 1 |
| 8 | 0 | 1 | 0 | 0 | 0 | 0 | 0 | 1 | 0 | 1 | 0 | 0 |

TABLE I-continued

| WORD | MAM R4 | R3 | R2 | R1 | R0 | B6 | B5 | B4 | B3 | B2 | B1 | B0 |
|---|---|---|---|---|---|---|---|---|---|---|---|---|
| 9 | 0 | 1 | 0 | 0 | 1 | 1 | 0 | 1 | 0 | 1 | 0 | 0 |
| 10 | 0 | 1 | 0 | 1 | 0 | 0 | 0 | 1 | 1 | 0 | 0 | 1 |
| 11 | 0 | 1 | 0 | 1 | 1 | 1 | 0 | 1 | 1 | 0 | 0 | 1 |
| 12 | 0 | 1 | 1 | 0 | 0 | 0 | 0 | 1 | 1 | 1 | 1 | 0 |
| 13 | 0 | 1 | 1 | 0 | 1 | 1 | 0 | 1 | 1 | 1 | 1 | 0 |
| 14 | 0 | 1 | 1 | 1 | 0 | 0 | 1 | 0 | 0 | 0 | 1 | 1 |
| 15 | 0 | 1 | 1 | 1 | 1 | 1 | 1 | 0 | 0 | 0 | 1 | 1 |
| 16 | 1 | 0 | 0 | 0 | 0 | 0 | 1 | 0 | 1 | 0 | 0 | 0 |
| 17 | 1 | 0 | 0 | 0 | 1 | 1 | 1 | 0 | 1 | 0 | 0 | 0 |
| 18 | 1 | 0 | 0 | 1 | 0 | 0 | 1 | 0 | 1 | 1 | 0 | 1 |
| 19 | 1 | 0 | 0 | 1 | 1 | 1 | 1 | 0 | 1 | 1 | 0 | 1 |
| 20 | 1 | 0 | 1 | 0 | 0 | 0 | 1 | 1 | 0 | 0 | 1 | 0 |
| 21 | 1 | 0 | 1 | 0 | 1 | 1 | 1 | 1 | 0 | 0 | 1 | 0 |
| 22 | 1 | 0 | 1 | 1 | 0 | 0 | 1 | 1 | 0 | 1 | 1 | 1 |
| 23 | 1 | 0 | 1 | 1 | 1 | 1 | 1 | 1 | 0 | 1 | 1 | 1 |

Each partial base address read from the ROM37 is applied as an input to the address adder 39. The circuits forming address adder 39 are preferably integrated circuit chips 39-1 and 39-2 of the type sold under the designation SN5483.

As a specific example of operation, consider the circumstance in which MACR27 (FIG. 1) stores a pointer to row decimal number 3 and MACC29 (FIG. 1) stores a pointer to column decimal number 29. In this circumstance the MACR14 through MACR0 signals define the binary number 00011, and the MACC6 through MACC0 signals define the binary number 0011101. With these pointers being selected by the multiplexor, the output signals of the multiplexors are as follows. PMA03 through PMA00 define the binary number 1101. MAMC6 through MAMC4, which serve as a partial relative address, define the binary number 001. MAMR4 through MAMR0 define the binary number 00011. From Table I it can be seen that the ROM37 in respone provides output signals whereby B6 through B0 are 1000101 respectively. The sum formed by the address adder 39, accordingly, is

| | |
|---|---|
| 1000101 | (Partial base address) |
| +001 | (Partial relative address) |
| 1000110 | Sum |

The Sum is concatenated with the output of the chip 65 so that the absolute address is 10001101101.

It should be noted here that the table of partial base addresses stored in the ROM37 in this specific embodiment is directed to facilitate providing the option of either a 12-row page or a 24-row page. Thus, all even numbered row pointers map into absolute addresses between the decimal range of 0 to 1023; all odd numbered row pointers map into absolute addresses in the decimal range 1024 to 2047. To provide the 12-row option, the least significant bit of the row pointer (such as MACR0) is simply not used, all absolute addresses thereby falling in the lower range, and only a single 1024-location RAM10 need be provided.

An explanation of how it can be determined what partial base addresses are to be stored in the ROM37 is as follows Let $(RC)/2 = q + r$ where RC is the row component modulo 10,

$q$ is the quotient modulo 10, and $r$ is the remainder modulo 10.

Then

B6 $= r$, and

M = 5 × *q* where

M is the binary coded number defined by B5 through B0.

As an example of the application of the foregoing, consider the row component 10111. This is the binary coded decimal number 23, and, upon division by 2, yields a quotient of decimal 11 and a remainder of 1. Therefore, B6 equals 1, and since 11 × 5 is 55, B5 through B0 are 1110111 (the BCD number 55).

In a similar manner it can be determined what partial base addresses are to be stored where it is desired to provide a different number of characters per row. For example, consider the circumstances where it is desired to provide only 72 characters per row instead of 80 as in this specific embodiment. To do this, it is preferably to store 8-bit wide partial base addresses comprising B7 through B0. B7 will equal *r* as defined above, and M will equal 9 × *q*, where M is the binary coded number defined by B6 through B0. Separately, it is necessary here to use the four (rather than only three) most significant bits of the column component as a relative address, and then to concatenate the sum with three least significant bits of the column component.

With reference again to FIG. 3, there is shown an adder circuit 71 which also preferably is an SN5483. A NAND gate 73 complements the CDL3 signal (provided by the line counter 59 of FIG. 2) to provide a $\overline{CDL3}$ signal. The adder circuit 71 responds to the $\overline{CDL3}$ signal and to the CDL2 through CDL0 signals to form four signals identified as CDC7A through CDC4A. These four signals are concatenated with CDC3 through CDC1 to serve as a multi-bit signal that sequentially defines a plurality of column components of address pointers. The adder circuit 71, together with the NAND gate 73, plays a role in the timing of the addressing of RAM10 in connection with the refershing of the buffer 51. Accordingly, a description of this operations will be given hereinafter after a more detailed description of other circuitry involved in this operation.

DATA WORD TRANSFERS FROM PAGE MEMORY TO BUFFER

Figure 4:
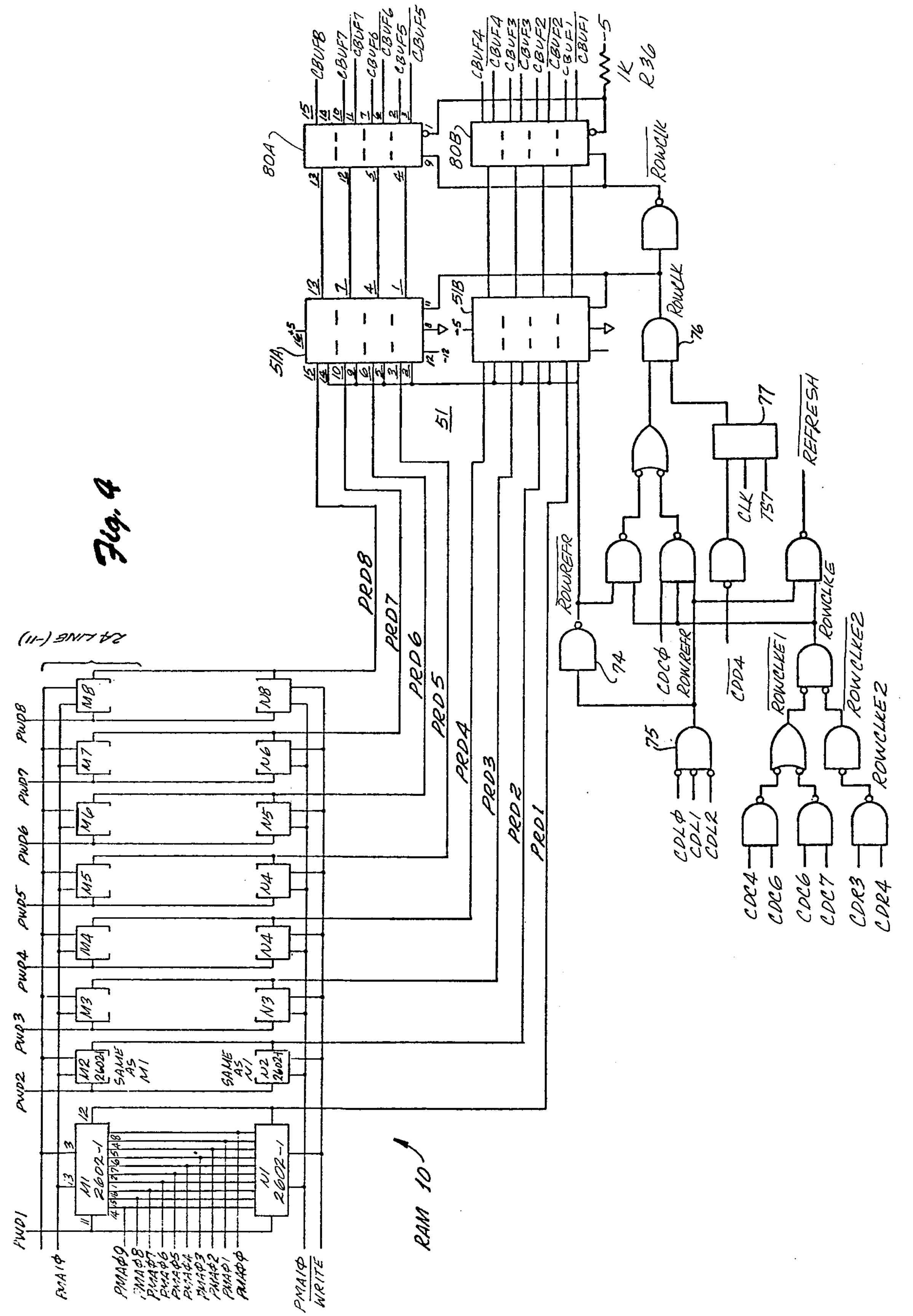

In FIG. 4 there is shown a portion of the circuitry within timing and control means 5 that is involved in data word transfers and the interconnection of this circuitry to the RAM10 and the buffer 51.

Preferably, the RAM10 comprises a plurality of integrated circuit chips of the type sold under the designation 2102 (by Intel). Each of these chips has sufficient storage capacity for 1024 bits. In this specific embodiment, each data word comprises 8 parallel bits, and, for a 24-row page, 1920 data words must be stored. Accordingly, 16 such chips are used.

Preferably, the buffer 51 comprises two integrated circuit chips 51A and 51B of the type sold under the designation 2532B (by Signetics). Each such chip includes 4 separate 80-bit wide registers, that are operable as recirculating shift registers.

The chips 51A and 51B are controlled in their operation by the signals $\overline{ROWREFR}$ and ROWCLK. The ROWCLK signal defines a pulse train whose pulse repetition frequency (prf) changes in accordance with two different modes of operation as will be explained. When the $\overline{ROWREFR}$ signal if 0, data words are transferred one-by-one into the buffer 51 at a rate determined by the prf at which ROWCLK then operates. When the $\overline{ROWREFR}$ signal is 1, the data words in the buffer are recirculated by recirculating shift register action at a rate determined by the prf at which ROWCLK then operates.

The $\overline{ROWREFR}$ signal is produced at the output of a NAND gate 74 as the complement of a ROWREFR signal. A NOR gate 75 produces the ROWREFR signal as the nor function of the signals CDL0, CDL1, and CDL2. Accordingly, the $\overline{ROWREFR}$ is 0 only when each of the signals CDL0, CDL1 and CDL2 equals 0. This occurs during the two consecutive blank-space lines between rows.

The ROWCLK signal is produced at the output of a two-input AND gate 76. A constant prf pulse train is provided to one input of the AND gate 76 by a flip-flop 77. The other input to AND gate 76 serves to enable or disable the AND gate 76 such that each pulse of the constant prf pulse train that occurs with AND gate 76 being enabled causes a corresponding ROWCLK pulse.

From an examination of FIG. 4 it can be seen that the Boolean function for this enabling input is:

$\overline{ROWREFR}$.ROWCLKE + CDCO.ROWCLKE.ROWREFR where

ROWCLKE = $\overline{CDC4\ CDC6}$.$\overline{CDC6\ CDC7}$.$\overline{CDR3\ CDR4}$.

Owing to this arrangement, the ROWCLKE signal is 1 so long as the column counter is in the decimal range 0 to 79 and the row counter is in the decimal range 0 to 23. Further, owing to the term CDCO, during the mode in which the buffer 51 is being refreshed, the ROWCLK signal has one-half the prf that it has during the mode in which recirculation is taking place.

The rate at which the buffer 51 is refreshed is synchronized with the rate at which data words are read from the RAM10. For an explanation of this reference is again made to FIG. 3. Initially, it should be noted that as to the overall column counter output (CHARSTATE), the CDC0 portion is not used in defining the column component of the row pointer for display read out. This is because CDC0 has a prf of twice the rate used in refreshing. Instead, only the CDC6 through CDC1 portions of the overall CHARSTATE signal is used. As the CHARSTATE signal proceeds in sequence to define in sequence the decimal numbers 0 to 79, the CDC6 through CDC1 portion proceeds at half the rate to define in sequence the decimal numbers 0 to 39. During the first of the two consecutive blank space raster lines, the CDL3 signal is 1, and its complement $\overline{CDL3}$ is 0. The adder 71 thus during this blank space line does not cause any address modification. However, when the $\overline{CDL3}$ is 1, an address modification is performed (i.e., decimal 40 is added to each pointer). Thus, during the second of the two consecutive blank-space lines, the decimal numbers 40 to 79 are defined.

DATA WORD TO VIDEO CONVERSION

Each data word shifted out of the buffer 51 is loaded into a character buffer 80 (FIG. 4) preferably comprising two integrated circuit chips 80A and 80B each of the SN54175 type.

Figure 5:
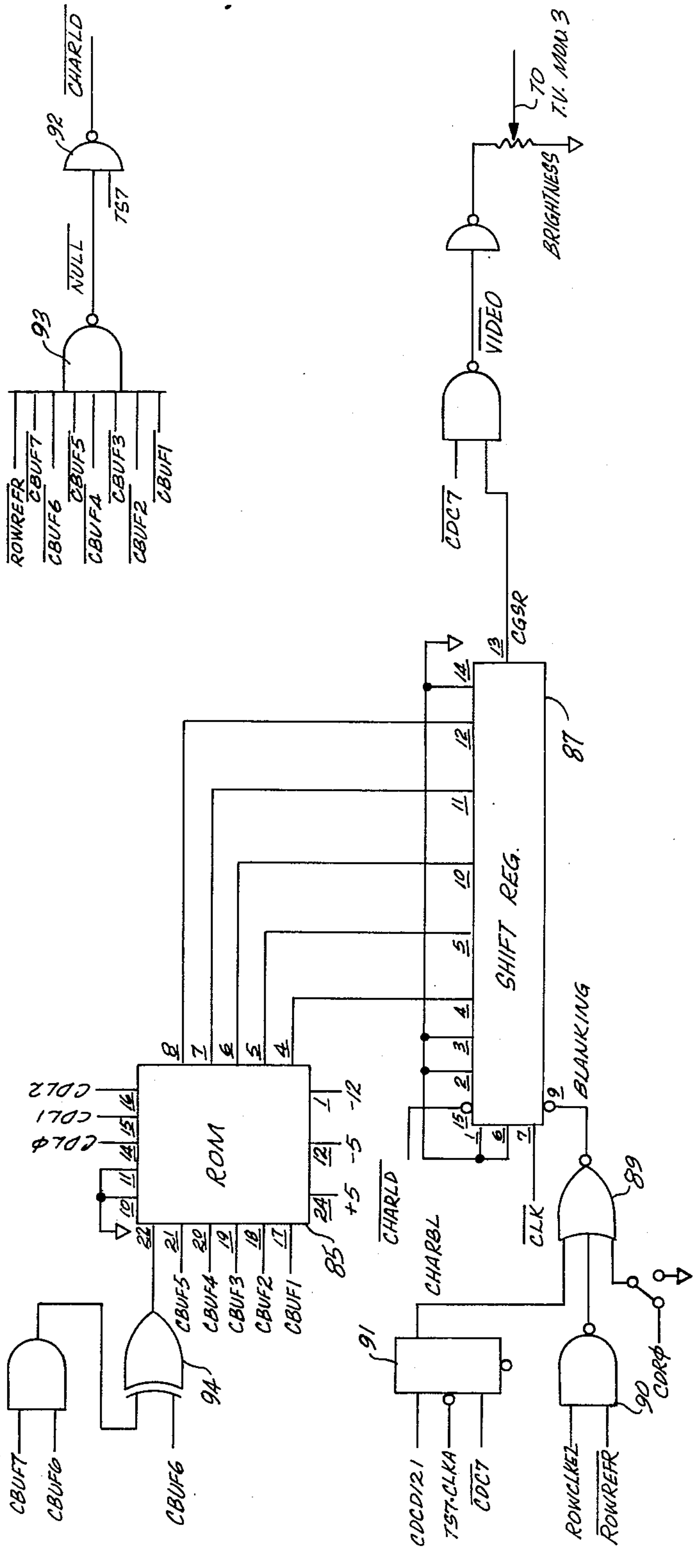

In FIG. 5 there is shown the preferred arrangement for converting each of these data words into the serial-by-bit video control signal. Preferably, there is provided a read-only memory 85 of the type sold by Signetics Corporation under the designation 2513 N/I CM2140. The memory 85 is addressed in accordance with the output of the character buffer 80 and the individual signals making up the LINESTATE signal. A shift register 87, preferably of the SN54166 type, is coupled to be loaded by the memory 85. Its output, identified as CGSR, is coupled through a conventional gating arrangement to a brightness control potentiometer whose tap is connected in turn to the monitor 3.

Various control signals are applied to the shift register 87. Among these is a BLANKING signal produced by a NOR gate 89. One of the inputs to the NOR gate 89 is connected to receive either the CDR0 signal (for the 12-row option) or 0 volts (for the 24-row option). Another of these inputs is derived from a NAND gate 90 responsive to the ROWCLKE 2 and $\overline{\text{ROWREFR}}$ signals. The third and last input, identified as CHARBL, is derived from a flip-flop 91.

Another control signal, identified as $\overline{\text{CHARLD}}$, is derived from a NAND gate 92 whose two inputs are $\overline{\text{NULL}}$ signal and a TS7 signal. The TS7 signal is provided, as will be described, by the timing means 5. The NULL signal is provided by a NAND gate 93, preferably of the SN5430 type.

In operation, each data word coupled to the memory 85, together with the LINESTATE signal, serves as an address causing the reading out of a location in the memory 85. One of the addressing bits is derived from an exclusive OR gate 94 that receives as inputs the signals CBUF6 and CBUF6.CBUF7. (The purpose of modifying this addressing bit is to effect a conversion between 7-bit data words that can represent both upper and lower case characters to the conventional 6-bit data words of a 64 character set.)

As each location is so read out, the shift register 87 is loaded and thereafter, in response to the $\overline{\text{CLK}}$ signal, shifting occurs to form the CGSR signal.

CONTROL SIGNALS

As has been mentioned above, the control and timing means 5 includes circuitry for producing various control and timing signals. That portion of the circuitry relating to the cyclical counting means has already been described.

Figure 6:
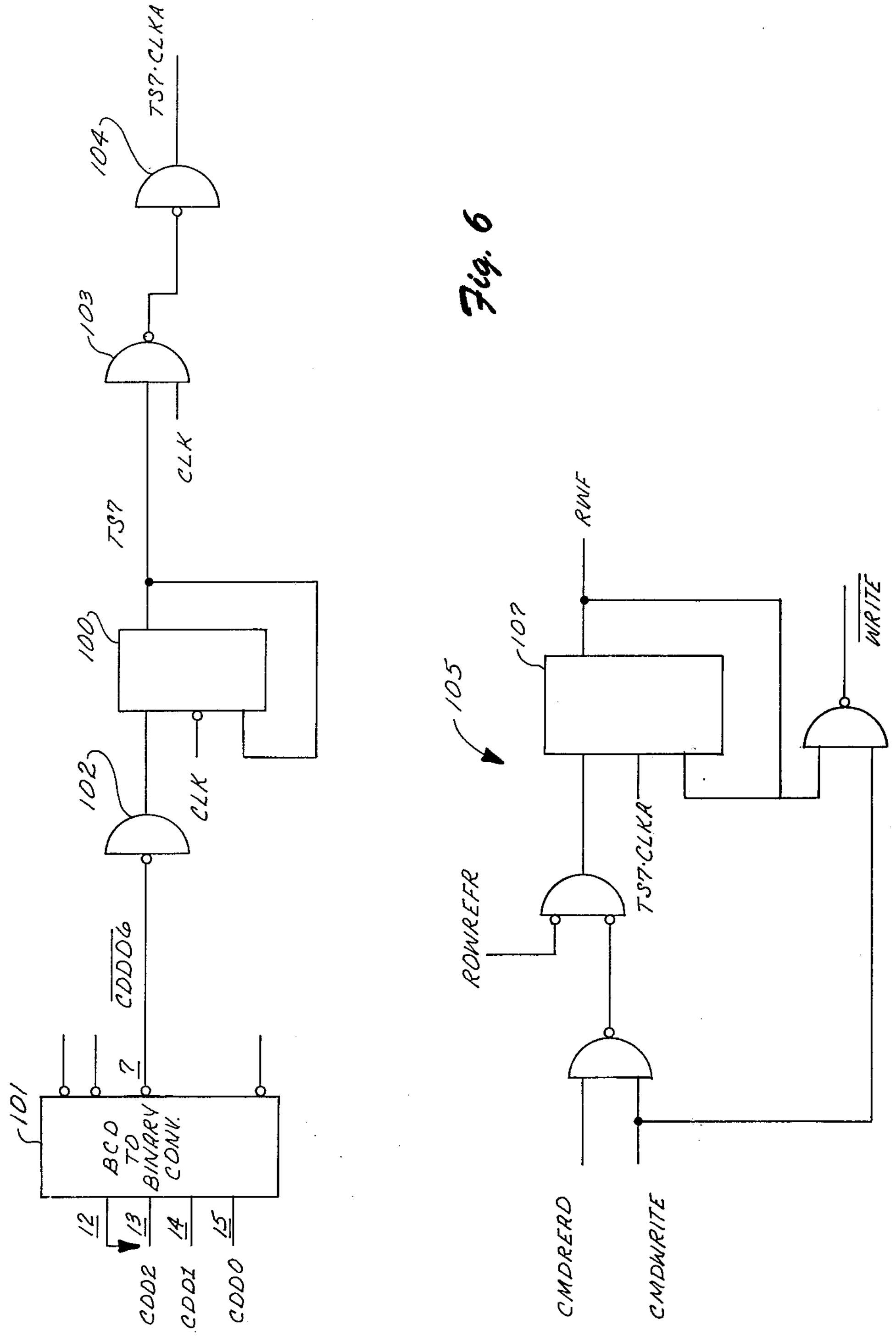

In FIG. 6, there are shown logic circuits involved in producing other control signals of interest to this description.

Among these is timing state 7 (TS7) signal. This is produced by a flip-flop 100. The CLK signal triggers flip-flop 100, a CDDD6 signal serves as its set input, and the TS7 signal serves as its reset input. The CDDD6 signal is 1 each time the DOTSTATE signal defines decimal number 6, and is 0 otherwise. To produce this signal, there are provided, in tandem connection, a BCD to binary converter 101 of the SN5442 type and an inverter 102. Owing to this arrangement, the TS7 signal defines a pulse train, each pulse of which is synchronized with the column-by-column traversal of the beam of the monitor 3.

The TS7.CLKA signal, used to trigger the flip-flop 91 (FIG. 5), is formed by an arrangement comprising NAND gates 103 and 104.

The $\overline{\text{WRITE}}$ signal, used in controlling the RAM10, is formed by an arrangement indicated generally at 105. Flip-flop 107 within this arrangement provides the RWF signal used in connection with the control of the address pointing multiplexing (see FIG. 3). The CMDREAD and CMDWRITE signals are formed by conventional logic circuits so as to control the updating of the RAM10. When either of these signals is a 1 thereby indicating that an access is to be made to RAM10 in connection with the updating, then on the next TS7.CLKA pulse the flip-flop 107 is set. Thus, the RWF signal changes to 1 to indicate such an access is taking place.

ROW AND ADDRESS COUNTERS

Figure 7:
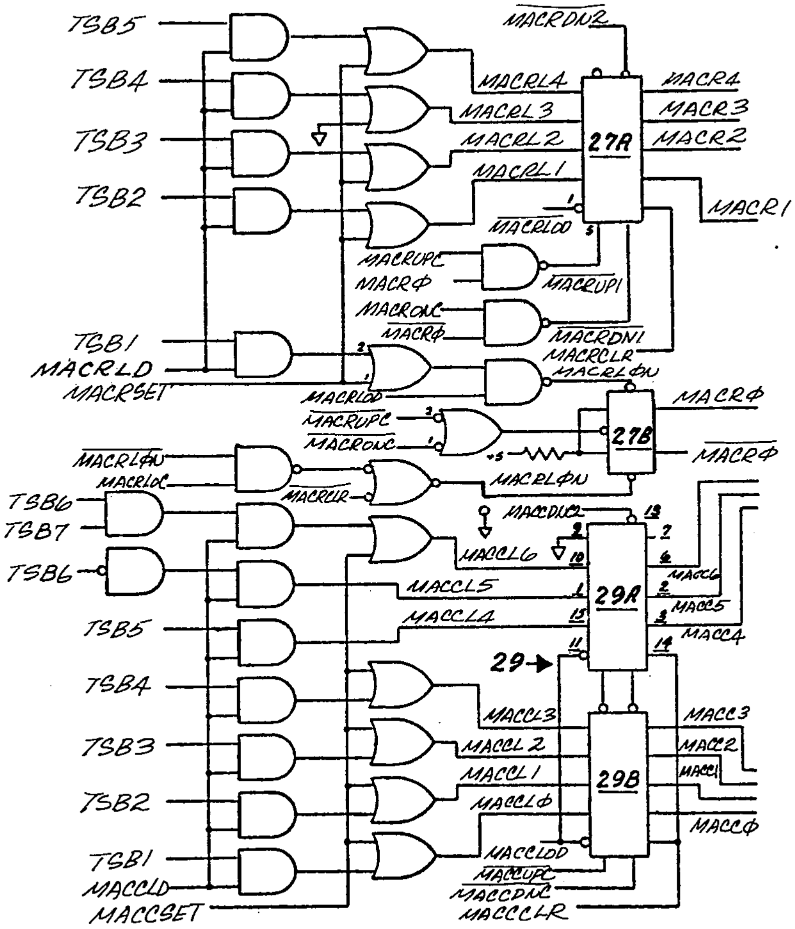

FIG. 7 shows in more detail the preferred arrangement of MACR27, MACC29, and some of the gating circuits relating to them. Inasmuch as a relatively large number of control signals are involved in the operation of these circuits, some of the related logic circuits are not shown and instead a Boolean function for each such signal is given herein.

The MACC29 preferably comprises two integrated circuit chips 29A and 29B each of the SN54193 type. Under the control of a MACCLD signal and a $\overline{\text{MACCLOD}}$ signal, MACC29 can be preset in accordance with a column component carried on the tri-state bus (i.e., TSB1 through TSB7). To this end, a bank of AND gates are each responsive to the MACCLD signal and each of the chips 29A and 29B is responsive to the $\overline{\text{MACCLOD}}$ signal. This feature of the arrangement is useful, for example, in circumstances in which the operator desires to use the keyboard to enter an address pointer in preparation for an editing correction.

More typically, the operator types a string of characters and, as each key is depressed thereby causing an entry into the RAM10, it is desired to increment by one the matrix address pointer. Also, it is sometimes desired to decrement by one the matrix address pointer as when a back-space key or the like is depressed. For this reason, the MACC29 operates as an up/down counter. The $\overline{\text{MACCUPC}}$ signal controls the incrementing of MACC29, and the $\overline{\text{MACCDNC}}$ signal controls the decrementing.

When as a result of such incrementing the end of a display row is reached (i.e., column 79), then the MACC29 is to be cleared so as to point to column 0. Also the MACR27 is to be incremented so as to point to the next row. The MACCCLR signal controls this clearing operation for the MACC29. Similarly, to provide for back-spacing from the beginning of one row to the end of the preceding row, the MACC29 can be set to point to column 79. The MACCSET signal controls this operation.

The MACR27 preferably includes a chip 27A of the SN54193 type and a flip-flop 27B, these being interconnected in conventional manner to form a five-stage up/down counter. As with MACC29, there are provided gates providing for loading, clearing, and setting MACC27. The signals MACRLD and $\overline{\text{MACRLOD}}$ control the loading operation. The signal MACRCLR controls the clearing operation. The signal MACRSET controls the setting operation.

As to the Boolean functions for the various control signals, an inspection of FIG. 7 shows, for example, that MACRL4 = TSB5.MACRLD + MACRSET. The relatively few Boolean functions that are not evident from such an inspection are given below $\text{MACCLAST} = \text{MACC6.MACC3.MACC2.MACC1.}\overline{\text{MACC0}}$ $\overline{\text{MACCFIRST}} = \text{MACC6} + \text{MACC5} + \text{MACC4} + \text{MACC3} + \text{MACC2} + \text{MACC1} + \text{MACC0}$ $\text{MACCCLR} = \text{MACCLAST.MACCING}$ $\text{MACCUPC} = \overline{\text{MACCLAST}}\text{.MACCING}$ $\text{MACCDNC} = \overline{\text{MACCFIRST}}\text{.MACCDEC}$ $\text{MACCSET} = \text{MACCFIRST.MACCDEC}$ $\text{MACRLAST} = \text{MACC4.MACC2.MACR1.MACR0}$ $\overline{\text{MACRFIRST}}$ = MACR4 + MACR3 + MACR2 + MACR1 + MACR0

MACRCLR = MACRLAST.MACCLAST.MACCING

MACRSET = MACRFIRST.MACRFIRST.MACCDEC + MACRFIRST.MACRDEC

MACRUPC = $\overline{\text{MACRLAST}}$.(MACRING + MACCCLR.MACCING)

MACRDNC = $\overline{\text{MACRFIRST}}$ (MACRDEC + MACCSET.MACCDEC)

I claim:

1. In a data display terminal having a television monitor in which a beam is deflected in position to sweep in a pattern of raster lines and is intensity modulated so that a first plurality of the raster lines provide for displaying a page of characters arranged in rows and columns, and a second plurality of raster lines provide blank spaces between rows, the combination comprising:

first memory means comprising a random-access memory having a plurality of locations each addressable by an absolute binary address, the locations for respectively storing multi-bit data words encoded to represent characters, the first memory means having storage capacity sufficient to store each of the data words for a full page;

second memory means having storage capacity sufficient to store each of the data words for a full row;

counting address register means associated with the random access memory and providing for the storage of address pointers that are represented in matrix notation including a row component and a column component, the counting address register means including separate counting registers for the row and column components with the column component counting register operable to count cyclically through a total number of counts that is not a power of two;

address converter circuit means, coupled between the counting address register means and the random access memory and including address adder circuit means, for converting each such address pointer to an absolute binary address for the random access memory;

means responsive to sequentially converted pointers each containing the same row component for sequentially reading out from the random access memory each data word for that row;

the second memory means being coupled to the random access memory to receive the sequentially read out data words;

converter circuit means having a first input coupled to the second memory means for receiving data words one at a time, and having an output for generating a serial-by-bit signal for controlling the intensity of the beam; and means for transferring a data word at a time from the second memory means to the converter circuit means.

2. The combination of claim 1 wherein the address converter means comprises a table look-up memory for storing base addresses, means responsive to each address pointer for accessing the table look-up memory to obtain a selected base address, and circuit means for combining the selected base address with the address pointer to produce the absolute address for the random access memory.

3. The combination of claim 2, wherein the circuit means for combining addresses comprises an address adder circuit.

* * * * *

UNITED STATES PATENT AND TRADEMARK OFFICE

CERTIFICATE OF CORRECTION

PATENT NO. : 3,955,189

DATED : May 4, 1976

INVENTOR(S) : Douglas H. Thomson

It is certified that error appears in the above-identified patent and that said Letters Patent are hereby corrected as shown below:

| | |
|---|---|
| Column 2, line 19 | After "characters" delete "to" |
| Column 4, line 9 | Change "well" to -- will -- |
| Column 7, line 56 | Change "an" to -- and -- |
| Column 10, line 27 | "MACR14" should read -- MACR4 -- |
| Column 11, line 16 | "preferably" should read -- preferable -- |
| Column 11, line 37 | "refershing" should read -- refreshing -- |
| Column 11, line 39 | "operations" should read -- operation -- |
| Column 11, line 66 | "if" should read -- is -- |
| Column 13, line 20 | "NULL" should read -- $\overline{\text{NULL}}$ -- |
| Column 14, line 64 | "MACCING" should read --MACCINC -- |
| Column 14, line 65 | "MACCING" should read -- MACCINC -- |
| Column 15, line 3 | "MACCING" should read -- MACCINC -- |
| Column 15, line 8 | "MACCING" should read -- MACCINC --. |

Signed and Sealed this

Twentieth Day of July 1976

[SEAL]

*Attest:*

RUTH C. MASON
*Attesting Officer*

C. MARSHALL DANN
*Commissioner of Patents and Trademarks*